United States Patent [19]

Gehrig

[11] 4,116,466
[45] Sep. 26, 1978

[54] FLUID SUPPLY FOR OCCUPANT RESTRAINT SYSTEM

[75] Inventor: Robert G. Gehrig, Southfield, Mich.

[73] Assignee: Eaton Corporation, Cleveland, Ohio

[21] Appl. No.: 718,737

[22] Filed: Aug. 30, 1976

Related U.S. Application Data

[63] Continuation of Ser. No. 528,247, Nov. 29, 1974, abandoned.

[51] Int. Cl.² .............................................. B60R 21/08
[52] U.S. Cl. ...................... 280/736; 102/39; 280/741; 422/105; 422/165
[58] Field of Search .................. 280/741, 736; 23/281; 102/39

[56] References Cited

U.S. PATENT DOCUMENTS

| | | | |
|---|---|---|---|
| 2,517,209 | 8/1950 | Jackson | 23/281 |
| 3,711,115 | 1/1973 | Lohr | 280/736 |
| 3,724,870 | 4/1973 | Kurokawa | 280/741 |
| 3,773,351 | 11/1973 | Catanzarite | 23/281 X |
| 3,827,715 | 8/1974 | Lynch | 280/741 |
| 3,845,970 | 11/1974 | Herrmann | 280/741 |
| 3,865,660 | 11/1975 | Lundstrom | 280/741 |
| 3,878,969 | 4/1975 | Prochazka | 280/741 |
| 3,880,595 | 4/1975 | Timmerman | 280/741 |
| 3,891,233 | 6/1975 | Damon | 280/741 |
| 3,904,221 | 9/1975 | Shiki | 280/736 |
| 3,984,126 | 10/1976 | Goetz | 280/741 |

Primary Examiner—John P. Silverstrim
Attorney, Agent, or Firm—Edward C. Crist

[57] ABSTRACT

A fluid supply is provided for inflating an expandable confinement of a vehicle occupant restraint system of the type activated in response to a vehicle collision signal. The fluid supply includes a housing defining a fluid discharge port for directing fluid flow from the housing and a gas generating material disposed within the housing. The gas generating material includes a sustaining charge comprising a plurality of layers of granulated material, the layers being approximately equal by weight. Screens are disposed between each pair of adjacent layers of the sustaining charge. Each of the screens has a mesh substantially finer than the granules of material in the layer adjacent the screen and oppositely disposed from the fluid discharge port. The sustaining charge is activated in response to a collision signal. Preferably, a filter is included between the fluid discharge port and the layer of granulated material closest thereto and the screens act as intermediate filters to trap any particles of the combustion product which are approximately as large as the original granules, thus preventing too many of these particles from clogging the filter, which would restrict the fluid flow area and cause an undesirable pressure buildup within the housing.

19 Claims, 2 Drawing Figures

FLUID SUPPLY FOR OCCUPANT RESTRAINT SYSTEM

This is a continuation, of application Ser. No. 528,247, filed Nov. 29, 1974, now abandoned.

BACKGROUND OF THE DISCLOSURE

The present invention relates to vehicle occupant restraint systems, and more particularly, to an improved fluid supply for use with such restraint systems.

In general, vehicle occupant restraint systems utilize some type of a crash sensor which senses the rapid deceleration which occurs when the vehicle is involved in a collision. The collision signal from the sensor actuates a fluid supply or inflator system which provides a quantity of inflation gas to inflate an expandable confinement which restrains the vehicle occupant. The restraint systems of the class described may be positioned in the dashboard for deployment in the passenger compartment of the vehicle, or may have the inflator and confinement portion of the system located on the steering wheel to deploy and restrain the driver. In the latter case, it is necessary that the fluid supply fit compactly adjacent the steering wheel hub, without extending too far toward the driver, or radially toward the rim of the steering wheel. Therefore, while the present invention is equally adapted for any occupant restraint system, it is especially useful for such a system which is located on the steering wheel, and will be described in connection therewith. It is also especially adapted for systems which utilize the combustion of gas generating material as the source of the inflation gas.

Among the prior art fluid supplies for occupant restraint systems are those exemplified by German Pat. No. 2,325,310, in which the generated gas flows radially out of a cylindrical housing. Another type of fluid supply is exemplified by U.S. application Ser. No. 459,529, which issued Oct. 5, 1976, as U.S. Pat. No. 3,984,126 filed Apr. 4, 1974 and assigned to the assignee of the present invention, showing a generally cylindrical housing from which the generated gas flows axially out of one end of a cylindrical housing and is then deflected radially. Among the common features of most such prior art fluid supplies are the inclusion of a mass of combustible gas generating material and some type of filter disposed between the combustible material and the fluid discharge port defined by the housing.

Among the problems associated with the prior art fluid supplies has been the tendency for the filters to become clogged with the fine particles of fly ash which comprise a certain, relatively small percent of the combustion product when the gas generating material burns. If sufficient clogging of the filter occurs, the flow area through which the generating gas is discharged may be restricted to the point that excessive pressure builds up within the housing, thus presenting the possibility of the fluid supply housing bursting rather than directing a controlled volume of filtered inflating gas into the confinement. As a result, it has been necessary to increase the strength of the housing to withstand the higher pressures, typically by increasing the thickness of the steel normally used for the housing.

In the course of development of fluid supplies, it has been found that among the combustion products formed by the burning of the gas generating material are solid "clinkers" or "sinters" which are burned particles of approximately the same size as the original granules of combustible material. It has further been found that the clinkers are desirable in that they are easier to retain and they filter some of the fine fly ash, thus preventing it from reaching the final-stage filter, i.e., the filter adjacent the fluid discharge ports.

SUMMARY OF THE INVENTION

Accordingly, it is an object of the present invention to provide an improved inflator system or fluid supply for use in a vehicle occupant restraint system.

It is another object of the present invention to provide such a fluid system which minimizes undesirable clogging of the discharge filter by the combustion products such as fine fly ash.

It is a more specific object of the present invention to provide a fluid supply which accomplishes the above-stated objects by utilizing more fully the ability of larger particles of combustion products, such as clinkers, to filter the smaller particles of combustion products, without restricting the flow of the generated inflating gas through the housing.

These and other objects of the present invention, which will become apparent upon a reading of the following detailed description, are accomplished by the provision of an improved fluid supply for inflatable vehicle occupant restraint systems of the type activated in response to a collision signal. The fluid supply comprises a housing defining a fluid discharge port for directing fluid flow from the housing and a gas generating means disposed within the housing. The gas generating means includes combustible means having a sustaining charge comprising a plurality of layers of granulated material, the layers being approximately equal by weight and a screen means disposed between each pair of adjacent layers of the sustaining charge. Each of the screen means has a mesh substantially finer than the granules of material in the layer adjacent the screen means, i.e., the layer upstream from the screen, opposite the fluid discharge port. Also provided is a means operable to activate the sustaining charge in response to a collision signal. Preferably, the sustaining charge includes first, second and third layers of granulated material and the screen means includes a first screen disposed between the first and second layers and a second screen disposed between the second and third layers.

In accordance with another aspect of the present invention, the charge activating means comprises a booster charge positioned within the housing such that the layers of granular material are disposed between the booster charge and the fluid discharge port. Preferably, the booster charge comprises less than about 10% by weight of the combustible means.

DESCRIPTION OF THE PREFERRED EMBODIMENT

Figure 1:
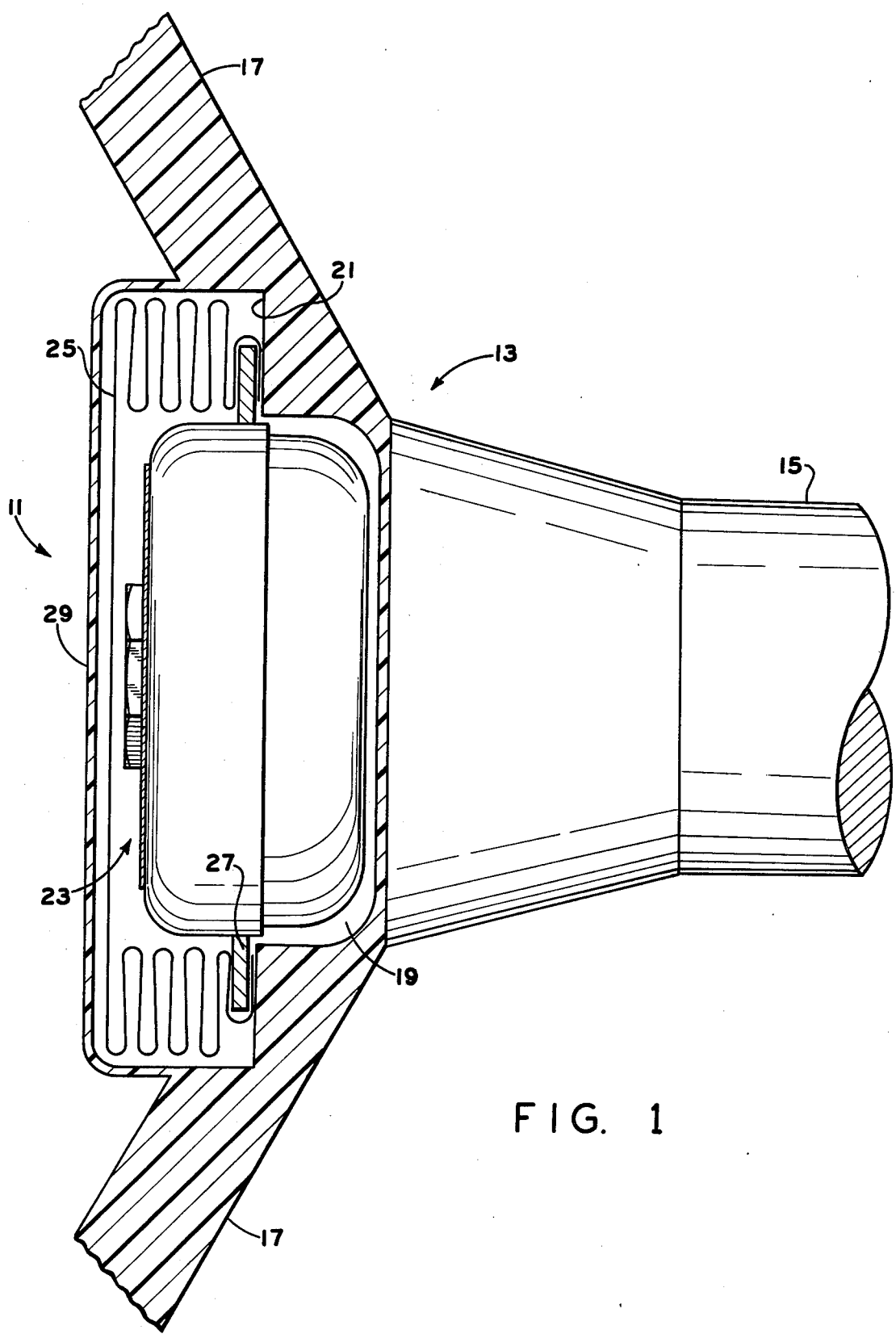
FIG. 1 is a fragmentary cross-sectional view taken through a vehicle steering wheel utilizing the present invention.

Referring now to the drawings which are for the purpose of illustrating a preferred embodiment of the present invention, and not for limiting the same, FIG. 1 is a fragmentary crosssectional view of a vehicle steering wheel, it being understood that the present invention is usable with occupant restraint systems for protecting the occupants of many types of vehicles, including, but not limited to automobiles, trucks, boats, and airplanes.

Referring again to FIG. 1, an occupant restraint system, generally designated 11, is illustrated positioned on a steering wheel, generally designated 13. The occupant restraint system 11 is preferably positioned near the hub of the steering wheel 13 which also includes a steering column 15 and oppositely disposed spokes 17 extending to and supporting the steering wheel rim (not shown). The central portion of the steering wheel 13 defines a chamber 19 and a shoulder surface 21. Within the chamber 19 is located the inflator or fluid supply, generally designated 23. Surrounding the fluid supply 23 is an inflatable confinement 25, the peripheral edge of which is secured between the shoulder surface 21 and an outer flange 27 disposed circumferentially about the fluid supply 23. The inflatable confinement 25 is stored within an enclosure 29 which is easily rupturable to permit the expansion of the confinement 25, the rupturing of the enclosure 29 being accomplished by the use of perforations, a weakened portion, or other suitable means. When a collision signal is sent to some type of electro-explosive means, well known in the art, within the inflator or fluid supply 23, the propellant or other combustible material contained therein is ignited and the resulting inflation gas passes from the fluid supply, inflating the confinement 25 and forcing open the enclosure 29.

Figure 2:
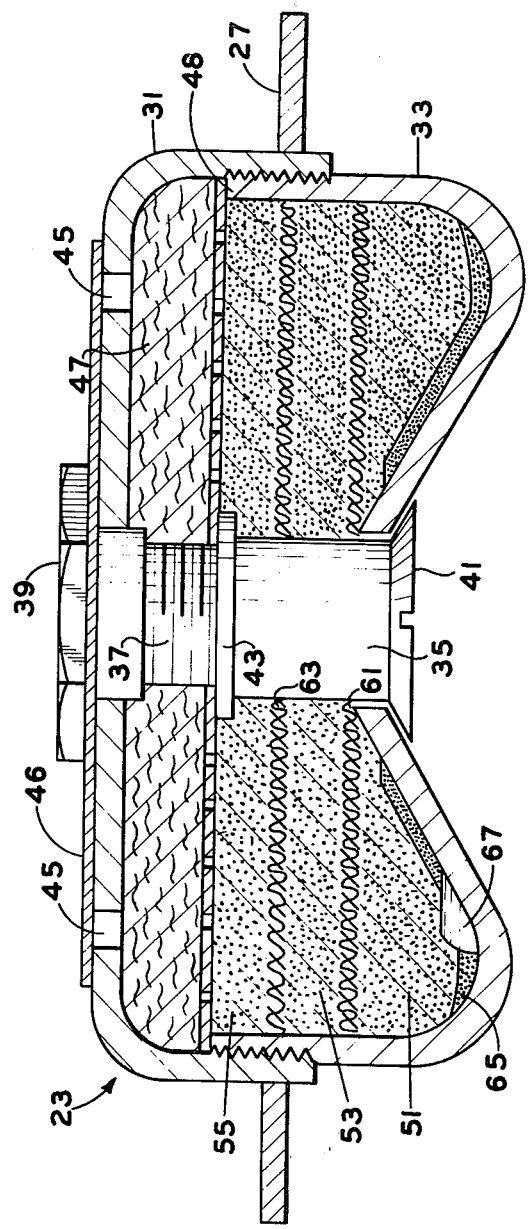
FIG. 2 is a cross-sectional view taken through the fluid supply of the present invention.

The cross-sectional view of the fluid supply 23, as is shown in FIG. 2, illustrates the fluid supply in greater detail. The flange 27 is welded about the outer periphery of a cover member 31 which is threadably connected to a base member 33. The cover member 31 and base member 33 are centrally supported and axially restrained by a stud or member 35 having a threaded portion 37 adjacent the covering thereof, with a nut 39 threaded onto the portion 37 to engage the central region of the cover member 31. The stud 35 has a head portion 41 engaging the outer surface of the conical portion of base member 33, and intermediate the cover end and the base end of the stud 35 is a shoulder 43, the function of which will be described subsequently.

The cover member 31 defines a plurality of passages or apertures 45, which may be placed in any one of a number of patterns about the upper portion of the cover member 31. Preferably, the apertures 45 are distributed generally uniformly about the surface of the cover member 31 and are of sufficient number and size to provide suitable passage means for the inflation gas to pass from the housing of the fluid supply. The inflation gas is then directed radially outward by a deformable diffuser 46 which is described in greater detail in copending U.S. application Ser. No. 459,529, filed Apr. 10, 1974 and assigned to the assignee of the present invention. Because the pressure generated by the combustion of the propellant may reach about 3500 psi ($2.415 \times 10^9$ Pa) or more, it is desirable that the cover member 31 and base member 33 be made from pressure vessel steel, and in the subject embodiment, the outside diameter of the cover member 31 is about 4 inches (10.2 cm), while the wall thickness of the pressure vessel steel is about 0.156 inches (0.39 cm).

Disposed within the cover member 31, and adjacent the passages 45, is a filter pack 47, the function of which is to accomplish the final-stage filtering of the generated gas before it passes from the fluid supply. The filter pack 47 is preferably maintained in a position shown by the shoulder 43, and a shoulder 48 of the base member 33, and may comprise a central region of filter material such as fibreglas and a pair of restraining layers of a material such as a steel screen.

The remainder of the chamber within the fluid supply is substantially filled with the means for generating the inflation gas needed to expand the confinement 25. This combustible means is shown as including three layers 51, 53 and 55 of granular, combustible material, with the layers 51, 53 and 55 being approximately equal by weight. Disposed between layers 51 and 53 is a screen 61 and disposed between layers 53 and 55 is a screen 63, the function of which will be described subsequently.

As will be understood by those skilled in the art, the present invention resides primarily in the layered, physical arrangement of the combustible material and screens and is not related to, or dependent upon the chemical composition of the combustible material or the material utilized for the screens 61 and 63. However, in the subject embodiment, the combustible material comprises an azide-base mixture, such as sodium azide ($NaN_3$) and the screens are formed from a corrosion resistant material such as stainless steel. For additional information regarding the chemical composition of a combustible material especially suited for use with the present invention, reference should be made to copending U.S. application Ser. No. 714430, filed Aug. 13, 1976 in the name of George W. Goetz and assigned to the assignee of the present invention. Preferably, the combustible material is such that the combustion product comprises solid, porous sinters (or "clinkers"), rather than being in the liquid or gaseous state.

It is a feature of the present invention that the granules of combustible material have a substantially larger mesh size than the screens 61 and 63 so that the granules are not permitted to pass through the screen prior to combustion. It will be understood that the term "mesh" is used herein in its conventional meaning to indicate, in reference to screen, the number of openings per linear inch. In reference to granules, the specified mesh range includes a first number indicating the highest mesh number of screen through which the granules can pass, and a second number which indicates the lowest mesh number of screen which can prevent passage of the granules. For example, granules which are specified as 6-8 mesh will pass through any screen up to and including a 6 mesh screen, but will not pass through any screen which is 8 mesh or higher. In the subject embodiment, it was found that good results were achieved by using screens which were anywhere from 60-100 mesh and by using granules of combustible material which were generally in the range of 4-14 mesh.

In one specific embodiment of the present invention, each of the layers 51, 53 and 55 comprises granules in the range of 6-8 mesh, and in another embodiment, layer 51 comprises granules in the range of 8-14 mesh (fine), layer 53 comprises granules in the range of 6-8 mesh (medium), and layer 55 comprises granules in the range of 4-6 mesh (coarse). It has been found that by separating the granules of combustible material into a plurality of layers and providing a screen between each pair of adjacent layers, the larger particles of combustion product (clinkers or sinters) are trapped by the adjacent downstream screen, i.e., the screen in contact with that layer and disposed between that layer and the passages 45. Trapping the clinkers which are too large to pass through the screen takes advantage of the ability of those clinkers to filter out the particles of fly ash which would otherwise clog the final stage filter as described previously. In the preferred embodiment, the bulk density of the packed combustible material is in the range of about 75–125 lbs. per cubic foot.

It is, of course, necessary to provide some means for initiating burning of the charge of combustible material, or "activating" the charge. Referring again to FIG. 2, there is shown on the bottom interior surface of the base member 33 a layer of a booster charge 65, which may be ignited by an initiator or "squib" 67 which is electrically actuated as is well known in the art. The squib 67 which may be used with the present invention is of the type including a pair of lead wires which are joined, within the squib, in a bridge wire, the remainder of the squib being filled with a material such as lead staphnate which is ignited by the heat generated in the bridge wire. In the subject embodiment, the squib assembly, including the leads has an electrical resistance of 4.5 ohms.

The booster charge 65 should comprise less than about 10% by weight of the total combustible means (i.e., booster charge plus granules of combustible material), and may preferably be in the range of about 3–4% by weight. The booster charge preferably comprises a combustible material having a faster surface burn rate than that of the combustible material comprising layers 51, 53 and 55. This faster surface burn rate permits rapid ignition of the entire layer of booster charge and subsequently, more uniform burning of the sustaining charge (layers 51, 53 and 55). Although many fast burning combustible materials may be used, the booster charge in the subject embodiment comprised granules in the range of 10–35 mesh of a mixture including an azide, such as sodium azide (NaN$_3$) and potassium perchlorate (KC10$_4$). The booster charge layer may be adhered to the bottom surface of the base member 33 by means of a thin layer of an RTV (room temperature vulcanizing) silicon rubber or an adhesive which is not readily subject to high temperature degradation.

Optionally, rather than utilizing the booster charge 65, a portion of the sustaining charge may have an effective amount of a combustible material having a higher ignitability or surface burn rate than that of the remainder of the sustaining charge and such "booster" material may be added to the layer closest to the squib 67, in the subject embodiment, the layer 51. Such an arrangement will also serve the purpose of achieving a fast, uniform burn of the sustaining charge.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I now claim:

1. A fluid supply for inflating an expandable confinement of a vehicle occupant restraint system of the type activated in response to a vehicle collision signal, said fluid supply comprising:
   (a) housing means defining a fluid discharge port for directing fluid flow from said housing means;
   (b) gas generating means disposed within said housing means and including combustible means having
      (i) a sustaining charge comprising a plurality of layers of granulated material, said sustaining charge being of the type which, upon combustion, produces solid, porous sinters and fly ash;
      (ii) screen means disposed between adjacent layers of said sustaining charge, each of said screen means having a mesh substantially finer than the granules of material in the layer adjacent said screen means and upstream therefrom, each of said screen means permitting gas to pass freely therethrough and retaining said sinters upstream therefrom, said retained sinters being effective for permitting said generated gas to pass therethrough while simultaneously filtering said fly ash; and
   (c) means operable to activate said sustaining charge in response to said collision signal.

2. A fluid supply as defined in claim 1 wherein said sustaining charge comprises first, second and third layers of granulated material, and said screen means includes a first screen disposed between said first and second layers and a second screen disposed between said second and third layers.

3. A fluid supply as defined in claim 2 wherein said first layer is disposed adjacent said charge activating means, said third layer is disposed adjacent said fluid discharge port and said second layer is disposed between said first and third layers.

4. A fluid supply as defined in claim 3 including filter means disposed between said fluid discharge port and said third layer.

5. A fluid supply as defined in claim 1 wherein said plurality of layers of granulated material have a generally common granule size.

6. A fluid supply as defined in claim 5 wherein said plurality of layers comprise granules in the range of 6–8 mesh.

7. A fluid supply as defined in claim 1 including at least three layers of granulated material and at least a pair of screens, said screens having a generally common mesh size.

8. A fluid supply as defined in claim 7 wherein said screens have a mesh size in the range of 60–100.

9. A fluid supply as defined in claim 1 wherein said sustaining charge includes sodium azide.

10. A fluid supply as defined in claim 1 wherein the layer of granulated material remote from said fluid discharge port includes material having a first burn rate with a portion thereof being formed of material having a second burn rate, said second burn rate being faster than said first burn rate.

11. A fluid supply as defined in claim 1 wherein said charge activating means includes a booster charge disposed within said housing means oppositely from said fluid discharge port, and means for initiating combustion of said booster charge.

12. A fluid supply as defined in claim 11 wherein said booster charge comprises less than about 10 percent by weight of said combustible means and comprises granules of material having sizes in the range of 10–35 mesh.

13. A fluid supply as defined in claim 11 wherein said booster charge comprises from about 3 to about 4 percent by weight of said combustible means and includes potassium perchlorate.

14. A fluid supply as defined in claim 1 wherein said granulated material in said sustaining charge is of the type which, upon combustion, comprises solid, porous sinters.

15. A fluid supply for inflating an expandable confinement of a vehicle occupant restraint system of the type activated in response to a vehicle collision signal, said fluid supply comprising:

(a) housing means defining a fluid discharge port for directing fluid flow from said housing means;
(b) gas generating means disposed within said housing means and including combustible means having,
  (i) a sustaining charge comprising first, second, and third layers of granulated material having granules in the range of 8–14 mesh, 6–8 mesh, and 4–6 mesh, respectively;
  (ii) screen means disposed between adjacent layers of said sutaining charge, said screen means includes a first screen disposed between said first and second layers, and a second screen disposed between said second and third layers, each of said screen means having a mesh substantially finer than the granules of material in the layer adjacent said screen means and upstream therefrom; and
(c) means operable to activate said sustaining charge in response to said collision signal.

16. A fluid supply as defined in claim 15 wherein said first and second screens have a mesh sized in the range of 60–100.

17. A fluid supply for an expandable confinement of a vehicle occupant restraint system, said fluid supply being operable in response to an activating means and comprising:
(a) housing means defining a fluid discharge port operable to direct fluid flow from said housing means;
(b) gas generating means disposed within said housing means;
(c) filter means disposed downstream from said gas generating means and adjacent said fluid discharge port;
(d) said gas generating means including a sustaining charge of the type which, upon combustion, produces solid, porous sinters and fly ash, said sustaining charge comprising a first layer of granulated material adjacent said filter means, a second layer of granulated material upstream from said first layer and a third layer of granulated material upstream from said second layer, said first, second and third layers comprising granules in the range of about 4 to 14 mesh; and
(e) a first layer of screen disposed between said first and second layers of granulated material and a second layer of screen disposed between said second and third layers of granulated material, said first and second layers of screen having a mesh size in the range of about 60–100, each of said screen means permitting gas to pass freely therethrough and retaining said sinters upstream therefrom, said retained sinters effective for permitting said generated gas to pass therethrough while simultaneously filtering said fly ash.

18. A fluid supply as defined in claim 17 wherein said granulated material comprising third layer has a first burn rate, said third layer having a portion thereof containing a combustible material having a second burn rate faster than said first burn rate.

19. A fluid supply as defined in claim 17, wherein said third layer of granulated material includes potassium perchlorate.

* * * * *